(12) United States Patent
Povlovitsch Seixas et al.

(10) Patent No.: US 11,936,320 B2
(45) Date of Patent: Mar. 19, 2024

(54) THERMAL CONTROL FOR VEHICLE MOTOR

(71) Applicant: VITESCO TECHNOLOGIES GMBH, Hannover (DE)

(72) Inventors: Michel Povlovitsch Seixas, Toulouse (FR); Julien Métayer, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 368 days.

(21) Appl. No.: 17/421,659

(22) PCT Filed: Jan. 9, 2020

(86) PCT No.: PCT/EP2020/050457
§ 371 (c)(1),
(2) Date: Jul. 8, 2021

(87) PCT Pub. No.: WO2020/144292
PCT Pub. Date: Jul. 16, 2020

(65) Prior Publication Data
US 2022/0077810 A1    Mar. 10, 2022

(30) Foreign Application Priority Data
Jan. 9, 2019    (FR) ...................................... 1900173

(51) Int. Cl.
*G05B 13/02* (2006.01)
*B60L 3/00* (2019.01)
*H02P 29/60* (2016.01)

(52) U.S. Cl.
CPC ............ *H02P 29/60* (2016.02); *B60L 3/0061* (2013.01); *G05B 13/027* (2013.01); *B60L 2240/425* (2013.01)

(58) Field of Classification Search
CPC ........ B60K 2001/005; B60K 2001/003; B60K 2001/00307; B60K 11/06; B60K 11/02;
(Continued)

(56) References Cited

U.S. PATENT DOCUMENTS

| 5,525,881 | A | 6/1996 | Desrus |
| 5,678,760 | A | 10/1997 | Muso et al. |
| 2004/0069546 | A1* | 4/2004 | Lou .......................... F01P 7/167 180/65.265 |

FOREIGN PATENT DOCUMENTS

| CN | 108297677 A | 7/2018 |
| DE | 199 02 923 | 8/2000 |

(Continued)

OTHER PUBLICATIONS

Office Action issued in Chinese Patent Application No. 202080008468.9 dated Sep. 13, 2022.
(Continued)

*Primary Examiner* — Bryan R Perez
(74) *Attorney, Agent, or Firm* — NIXON & VANDERHYE

(57) ABSTRACT

The disclosed computer-implemented method optimizes thermal control of a vehicle motor, the vehicle including a cooling device including an actuator varying cooling capacity, the method including training a reinforcement learning algorithm including the iterative steps: 1) determining an action to control an actuator by applying a control function to a current state of the thermal system, and implementing the action; 2) determining a modified state of the thermal system after implementing the action; 3) calculating, by implementing a thermodynamic reward function of the motor, a reward value based on the modified state of the thermal system, and the action; 4) updating a function for estimating thermal performance based on the current state of the thermal system, the modified state of the thermal system,
(Continued)

the action and the reward; and 5) modifying the control function based on the update of the function for estimating thermal performance.

20 Claims, 2 Drawing Sheets

(58) Field of Classification Search
CPC . B60H 1/00278; B60H 1/00878; F01P 7/164; F01P 7/04; F01P 7/10; H02P 29/60
See application file for complete search history.

(56) References Cited

FOREIGN PATENT DOCUMENTS

| EP | 2 944 786 | 11/2015 |
|---|---|---|
| WO | 2013/150207 A1 | 10/2013 |

OTHER PUBLICATIONS

International Search Report for PCT/EP2020/050457 dated Feb. 26, 2020, 6 pages.
Written Opinion of the ISA for PCT/EP2020/050457 dated Feb. 26, 2020, 7 pages.
Lillicrap et al., "Continuous Control With Deep Reinforcement Learning", Version: arXiv:1509.02971V2, arXiv.org, Cornell University, Nov. 18, 2015, 14 total pages.
Wilde, "Neural Networks", Feb. 26, 2013, <https://web.archive.org/web/20130226112608/http://homepage.ntlworld.com/ivan.Wilde/notes/nn/nnnotespdf.pdf>, 126 total pages.
Sutton et al., "Reinforcement Learning: An Introduction", second edition (in progress), 2014, 2015, 352 total pages.
Barth-Maron et al., "Distributed Distributional Deterministic Policy Gradients," Published as a conference paper at ICLR 2018, Apr. 23, 2018, pp. 1-16.
Peters et al., "Natural Actor-Critic," ECML 2005, LNAI 3720, Springer-Verlag Berlin Heidelberg, 2005, pp. 280-291.

* cited by examiner

[Fig. 1]
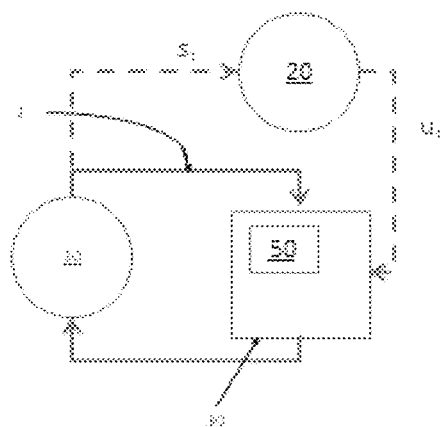
[Fig. 2]
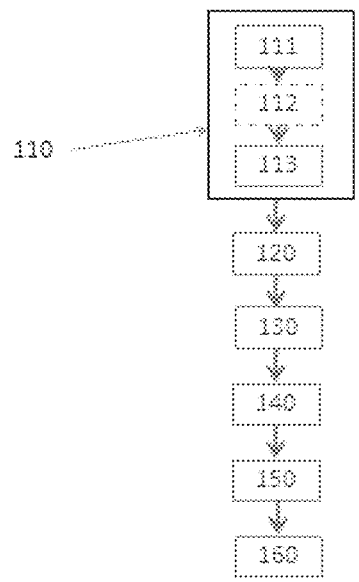

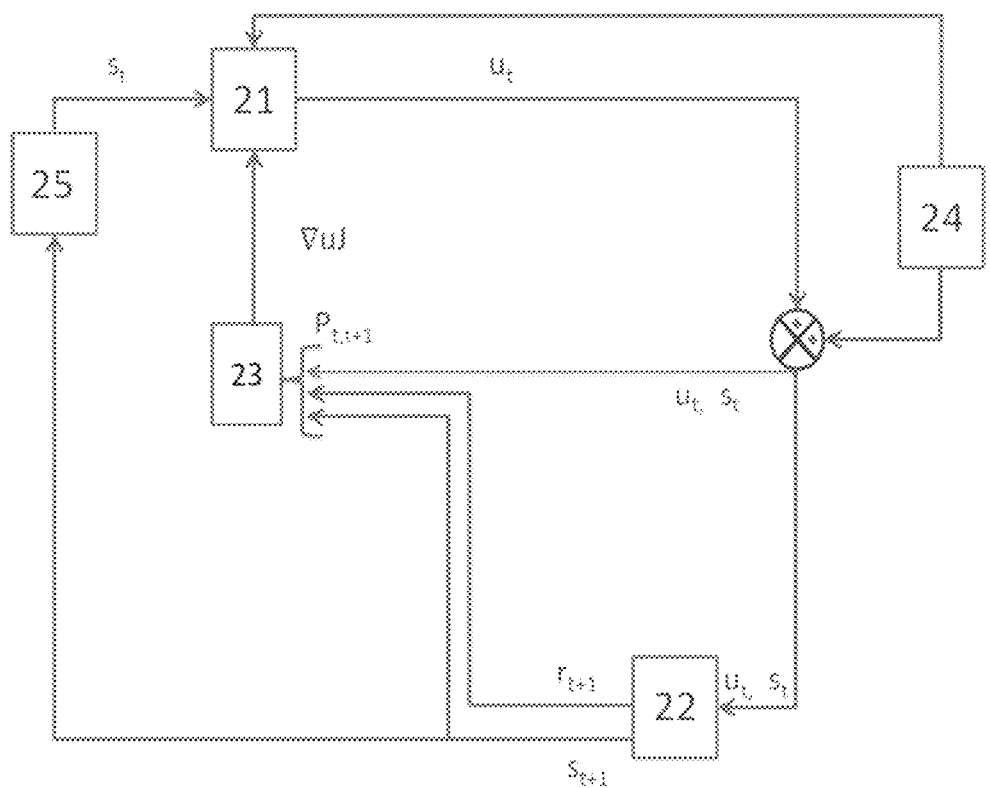
[Fig. 3]

THERMAL CONTROL FOR VEHICLE MOTOR

BACKGROUND OF THE INVENTION

Field of the Invention

The invention relates to a thermal control method for a vehicle motor, and a system for implementing this method. The invention is advantageously applied to the thermal control of a vehicle electric motor.

Description of the Related Art

Precise thermal control of the vehicle motor is advantageous in a number of aspects, as it makes it possible to increase both the longevity and performance of the motor. It is known that heat leads to deformation of materials that is detrimental to their service life.

In the case of electric motors, for example, they generate a lot of heat by the Joule effect, but the electronic components are sensitive to excessively high temperatures and have an operating temperature limit. Exposure to an uncontrolled temperature therefore impinges on the longevity of these motors.

Likewise, the consumption of electricity for the thermal control of the motor when this is not necessary reduces the range of the vehicle. It is therefore important to be able to optimize the thermal control of the motor in order to be able to keep the motor in an acceptable temperature range, while limiting the electricity consumption caused by this thermal control in order to optimize the range of the vehicle.

Two approaches are thus currently considered for the thermal control of the vehicle motor. They are implemented in a thermal system that comprises a motor, a cooling system, and at least one actuator suitable for varying a capacity for cooling the motor by means of the cooling device.

The rule-based approach is the most widely used and consists of applying a set of predefined rules. These thus prescribe control actions as a function of a given state of the thermal system. However, this approach is too imprecise to achieve optimum control of the system in that the states of the system and the rules are not sufficiently specific to the system in question. In addition, by their nature, these rules only take into account a very small quantity of parameters.

The second approach, which is optimization-based, takes into consideration the thermal resistance of the different parts of the system and the heat exchanges that take place between the motor and the motor cooling device, using optimized theoretical models. It therefore precisely considers a set of parameters of the system. As a result, the approach requires complete theoretical knowledge of the system and its linearities. In the case of complex systems, this approach becomes technically and economically infeasible. The system becomes very complicated to model and the design cost is too high. In addition, a large number of investigations would be required to validate the theoretical model in real conditions, which would generate significant costs. Finally, as this approach involves modeling the thermal behavior of a particular thermal system comprising the motor and its cooling system, it cannot easily be applied to other types of motor and/or cooling system.

SUMMARY OF THE INVENTION

The aim of the invention is therefore to respond to the problems posed by the two approaches set out above.

In particular, one aim of the invention is to propose a thermal control method for a vehicle motor that is simpler to implement than the prior art, and allows optimized control of the cooling of the motor.

To this end, the invention relates to a method for optimizing the thermal control of a vehicle motor, the vehicle comprising a device for cooling the motor comprising at least one actuator suitable for varying a capacity for cooling the motor by means of the cooling device,
the method being implemented by a computer suitable for controlling said at least one actuator,
the method being characterized in that it comprises the training of a reinforcement learning algorithm comprising the iterative implementation of the following steps:
1) determining at least one action to control at least one actuator by applying a control function to a current state of the thermal system comprising the motor and the cooling device, and implementing said action,
2) determining a modified state of the thermal system after the implementation of said action,
3) calculating, by implementing a thermodynamic reward function of the motor, a reward value based on the modified state of the thermal system and said action,
4) updating a function for estimating the thermal performance of the system based on the current state of the thermal system, the modified state of the thermal system, the action and the reward, and
5) modifying the control function based on the update of the function for estimating the thermal performance of the system.

In some embodiments, an exploration noise is added to the determination of the control action or to the parameters of the control function.

According to one embodiment, the thermodynamic reward function of the motor is configured to maximize the reward value when, based on the current state, the generation of thermodynamic irreversibilities brought about by the action is minimized.

According to one embodiment, the modified state of the thermal system after an action comprises at least one parameter identifying at least one action preceding said action.

According to one embodiment, the thermodynamic reward function of the motor is configured to penalize an action when the action causes the temperature of the motor to exceed a predetermined threshold.

According to one embodiment, the thermodynamic reward function of the motor is configured to penalize an action when the action is implemented while the ambient temperature is greater than the temperature of the motor.

According to one embodiment, the state of the thermal system is defined by at least one parameter from the following group: the air speed around the vehicle, the on or off state of the motor in the near future, one or more temperatures of the motor, one or more entropy values of the thermal system, and one or more actions implemented before the current state.

According to one embodiment, the motor is an electric motor.

According to one embodiment, the function for estimating the thermal performance takes the following form:

$$Q^\pi(s_t, u_t) = r_t + E\left[\sum_{j=1}^{n-1} \gamma^j r_{t+j} + \gamma^n Q^\pi(s_{t+n}, \mu(s_{t+n})) \bigg| s_t, u_t\right] \quad [\text{Math. 5}]$$

where γ is a depreciation factor, π is the set of parameters of the control function, and n is a number of additional time steps taken into account for calculating the function for estimating the thermal performance.

According to one embodiment, the depreciation factor γ is between 0.8 and 1 inclusive.

According to one embodiment, the value between two time steps of the training of the reinforcement learning algorithm is determined in correlation with the value n, and vice versa.

A further aim of the invention is a computer program product containing coded instructions for implementing the method described above, when it is implemented by a computer.

A further aim of the invention is a thermal control system for a vehicle motor comprising a computer that is suitable for implementing at least one action to control at least one actuator by applying a control function, said control function having been determined in advance by implementing the optimization method.

A further aim of the invention is a thermal control system for a vehicle motor comprising a computer suitable for implementing the method described above.

By implementing an actor-critic architecture combined with a reward calculation function that makes it possible to optimize the thermodynamic performance of the thermal system, the invention is capable of carrying out thermal control on complex systems in an optimum manner for a low inference calculation cost and without the need for experimental results. More specifically, the invention is based on an automatic reinforcement learning method such as that disclosed by the publication Continuous Control With Deep Reinforcement Learning (Lillicrap et al, 2015), more widely known as DDPG, which is an adaptation of an algorithm known as Q-Learning for a continuous control system, Q-Learning being implemented for discretized systems.

The automatic reinforcement learning method for training the control system will thus learn to control the thermal system efficiently without the need to rely on experimental data. The invention is therefore suitable for thermal systems of different levels of complexity.

BRIEF DESCRIPTION OF THE DRAWINGS

Further features, aims and advantages of the invention will become apparent from the following description, which is purely illustrative and non-limiting, and which must be read with reference to the appended figures, in which:

FIG. 1 shows the thermal system of a vehicle motor according to one embodiment of the invention.

FIG. 2 shows the main steps of the method for optimizing the thermal control according to one embodiment of the invention.

FIG. 3 shows the actor-critic architecture implemented by a computer according to one embodiment of the invention.

DESCRIPTION OF THE PREFERRED EMBODIMENTS

With reference to FIG. 2, a method for optimizing the thermal control of a motor of the vehicle according to one embodiment of the invention will now be described. This method makes it possible to manage the cooling of the motor of the vehicle so as to both keep the motor of the vehicle in an acceptable temperature range and reduce the electricity consumption of the cooling system of the vehicle as much as possible.

In this regard, the optimization method is implemented on a thermal system of a vehicle motor 1, shown schematically in FIG. 1, comprising a motor 10, for example but not limited to an electric motor, and a device 30 for cooling the motor, comprising at least one actuator 50, suitable for varying a capacity for cooling the motor.

In a preferred embodiment, the motor can be an electric motor. As electric motors must not be subjected to temperature stresses that are too sudden for the longevity and performance of the different electronic components that they contain, and as they impose additional constraints in terms of range, the invention can be particularly advantageously applied to this type of motor.

The optimization method is implemented by a computer 20, also shown in FIG. 1, which is suitable for receiving information about the state of the motor and the cooling device, this information being measured by one or more sensors embedded in or on the vehicle, and for controlling the actuator(s) of the cooling device of the motor by applying actions $u_t$ to control each actuator. One action to control an actuator of the cooling device is suitable for varying a cooling capacity of the cooling device.

With respect to the information acquired by the sensors and received by the computer 20, this component of the state of the system will be described in greater detail below.

With respect to the control action(s), they depend on the components of the cooling device, which can comprise at least one of the following: inverter, battery, pump, valve, louver, fan, radiator, flow pipes, coolant. In reality, the cooling device can consist of all types of element alone or in combination that make it possible to cool a vehicle motor. As the optimization of the thermal control of a vehicle motor according to the invention is not specific to one cooling system, all combinations of cooling devices are considered.

For example, if the cooling device is a pump that transfers a coolant towards the motor, a control action $u_t$ of the pump can be the modification of the flow rate of the pump.

In another example, the cooling device is a valve opening to the outside and the control action $u_t$ thereof consists of opening or closing the valve by a certain angle.

According to another embodiment, a control action can also consist of activating blades of a fan, at a predetermined speed, to cool the motor.

It is also possible for a control action to consist of opening or closing a louver, to a position among a plurality of possible positions, in order to cool a radiator when it is discharging the heat from the motor.

The invention does not however rule out the possibility of the control actions defined in the preceding examples being used at the same time or combined in one way or another. The fan, pump, valve, louver and radiator thus form an integral part of the cooling device covered by the invention and are not considered to be several separate cooling devices.

The computer 20 can therefore determine a control action $u_t$ for each of a plurality of different elements of the same cooling device.

In order to implement the optimization method, the computer 20 advantageously has an actor-critic architecture, described in the publication Natural Actor-Critic (Jan Peters, Sethu Vijayakumar and Stefan Schaal, 2008), the architecture of the computer 20 being shown schematically in FIG. 3. More specifically, the computer is advantageously configured to implement a DDPG reinforcement learning algorithm, which is a specific type of algorithm based on an actor-critic architecture described in the publication by Lillicrap et al cited above. Hereinafter, the notations used in said publication are used to describe the same objects or functions.

This architecture comprises a first block 21 representing the actor of the actor-critic architecture. This block 21 of the computer 20 receives the state $s_t$ of the thermal system and determines at least one control action $u_t$ to perform, by applying a control function $\pi$ to the state $s_t$. Advantageously, this block is implemented by an artificial neural network implementing the control function $\pi$.

The state of the thermal system is advantageously a vector comprising several parameters. According to one embodiment, the parameters of the state vector of the system comprise control actions $u_{t-1}$ $u_{t-2}$ $u_{t-3}$ ... $u_{t-n}$ preceding the control action determined by the block 21 for the state $s_t$. Advantageously, the parameters also comprise all or some of the following parameters: the air speed around the vehicle, the state of the motor in the near future (on or off), one or more temperatures of the motor, the entropy of the system in its current state and/or at least one of the preceding states. The state of the motor in the near future can be represented by a time before the motor is switched off, if the switching off of the motor is predicted or predictable, and failing this by parameters of the motor in the near future ($t_{+1}$, $t_{+2}$, ... , $t_{+n}$) such as, for example, but not limited to, the torque of the motor or its speed in revolutions per minute. The vehicle can therefore comprise one or more temperature sensors, one or more air speed temperatures, or one or more accelerometers, for example. In reality, it can comprise a set of sensors that make it possible to retrieve various navigation data, which can be used to determine the state of the thermal system.

In addition, the parameters of the state of the thermal system that are a function of time can have a complexity of order n, that is, they can have values for n states of the system preceding the time t. Thus for example, a state vector of the thermal system having a complexity of order 2 could be as follows:

$$S_t = [T, u_t, u_{t-1}, u_{t-2}, Q_{BSG}, BSG_{time}, V_{air}]$$

where T is one or more temperatures of the motor, $u_t$, $u_{t-1}$, $u_{t-2}$ are the control actions implemented respectively at t, t−1, and t−2, $Q_{BSG}$ is the quantity of heat of the thermal system at time t and/or the quantity of heat predicted in the near future, $BSG_{time}$ is a prediction of the state of the motor in the near future, $V_{air}$ is the air speed around the vehicle at time t and/or the air speed predicted in the near future.

A second block 22 evaluates the impact of the control action $u_t$ on the thermal system and determines the new state of the system $s_{t+1}$ together with a reward value $r_{t+1}$ associated with the state transition of the system observed from the given state $s_t$ to the modified state $s_{t+1}$. To do this, the block 22 retrieves the information from the different sensors in the thermal system and evaluates the reward to be allocated to the control action $u_t$ as a function of the new state of the thermal system, as described in greater detail below. A third block 23 represents the critic of the actor-critic system. The critic block 23 implements and updates a function for estimating the thermal performance of the thermal system as a function of the reward values determined by the block 22, this function being the Q function in the publication cited above, and advantageously being implemented by an artificial neural network. To do this, the critic block 23 comprises four inputs, the first being the action $u_t$, the second being the given state of the system $s_t$, and the third and fourth inputs being respectively the reward value $r_{t+1}$ and the new state of the system $s_{t+1}$ after the implementation of the action $u_t$. They are called $P_{t, t+1}$ in the figure. It also comprises a memory that stores all of the inputs $P_{t, t+1}$ at each time t. Given that the memory cannot be unlimited, the oldest $P_{t-n, t-n+1}$ information is deleted as the memory of the computer 20 becomes full by means of a First in First Out (FIFO) method.

The implementation and updating of the function Q for estimating the thermal performance of the system are described in greater detail below.

In FIG. 3, a fourth block 25 is used to show that the modified state of the system $s_{t+1}$ then becomes the new current state of the system $s_t$, a time step having elapsed.

With reference to FIG. 2, the optimization method implemented by the computer described above comprises the iterative implementation of the following steps.

In a first step 110, the block 21 of the computer determines, during a sub-step 111, at least one action $u_t$ to control at least one actuator 50 by applying the control function in its given state, based on the given state $s_t$ of the thermal system, and implements said action in a sub-step 113.

During a second step 120, the block 22 of the computer determines a modified state of the thermal system after the implementation of said action $u_t$.

During a third step 130, the block 22 calculates a reward value based on the state transition of the thermal system observed from the state $s_t$ to the modified state $s_{t+1}$, and said action $u_t$. This calculation is implemented by a thermodynamic reward function.

Advantageously, the thermodynamic reward function of the motor is configured to assign high reward values to the actions in which the thermal system of the vehicle motor 1 optimizes its thermal performance.

In one advantageous embodiment, the thermodynamic reward function of the motor is configured to maximize the reward value when, based on a given state $s_t$, the generation of thermodynamic irreversibilities brought about by the action $u_t$ is minimized. In other words, the thermodynamic reward function of the motor is also configured to minimize the destruction of exergy, that is, useful thermodynamic energy, which makes it possible in particular to minimize the electricity input on the part of the motor.

Advantageously, the thermodynamic reward function is also configured to penalize the reward value when the control action $u_t$ causes the temperature of the motor to exceed a predetermined threshold. For example, if the motor must not exceed a maximum operating temperature of 70 degrees in order not to impair its thermal performance, then the thermal reward function of the motor is configured to penalize the reward value associated with an action if this action leads to this maximum temperature being exceeded.

Advantageously, the thermodynamic reward function is also configured to penalize the reward value when a control action $u_t$ is implemented while the ambient temperature is greater than the motor temperature.

In some embodiments, the thermodynamic reward function can also penalize a reward value when the corresponding control action is implemented while the motor is off.

According to one exemplary embodiment, the thermodynamic reward function, which makes it possible to calculate the reward values, is defined as follows:

$$r = -\left(dSirr + \frac{1}{1 + e^{k_0(BSG\,time - 1)}} + \right.$$ [Math. 1]

$$k_1 \cdot \ln\left(1 + e^{k_2 \cdot (Tsys-Tmax)}\right) + \frac{k_3}{1 + e^{k_4(Tsys-Tmax)}} + \frac{2}{1 + e^{k_5(Tsys-Tamb)}}$$

where r is the reward,
$dS_{irr}$ is the generation of thermodynamic irreversibilities created by the transformation of the system,
BSG time is a time before the motor is switched off,
$T_{sys}$ is the temperature of the thermal system,
$T_{max}$ is the maximum temperature of the motor before its thermal performance is reduced, and
$T_{amb}$ is the ambient temperature around the vehicle.

The determination the thermodynamic irreversibilities created by the transformation of the system depends of course on the system. By way of non-limiting examples, these thermodynamic irreversibilities can be calculated, in the case of the cooling of an electric motor to the temperature $T_m$ by natural convection with air at a temperature $T_a$, by $dS_i = Q_{exch} \cdot (1/T_a - 1/T_m)$, where $Q_{exch}$ is the quantity of heat transferred. If this cooling is forced by using a cooling circuit provided with a pump, the thermodynamic irreversibilities include an additional term representing the dissipation of the pumping energy in the form of pressure loss: $dS_i = dS_i = Q_{exch} \cdot (1/T_a - 1/T_m) + A(P_{in} - P_{out})/T_a$, where $P_{in}$ and $P_{out}$ are the pressures upstream and downstream of the pump respectively, and A is an experimental coefficient.

During a fourth step 140, the block 23 associates the reward value $r_{t+1}$ with said action $u_t$ and the state transition observed from the given state $s_t$ to the modified state $s_{t+1}$, and stores this association $P_{t, t+1}$ in a memory.

During a fifth step 150, the block 23 updates the function for estimating the thermal performance. To do this, the block 23 firstly estimates the thermal performance of the system in the current state, and to this end it firstly implements the function Q in the state t, based on the action $u_t$ implemented for the state $s_t$, and knowing the control function implemented by the block 21 in its current state. The function Q calculates an expectation of the sum of the future rewards that can be obtained based on the current state $s_t$ of the system, and knowing the function π, and depreciated by a depreciation factor γ of between 0 and 1, described in greater detail below. This function can be calculated according to equation (1) of the publication cited above, or recursively by the Bellman equation referenced in equation (2) of said publication.

The updating of the function Q is then implemented by modifying the parameters of this function (that is, the weighting factors of the neural network implementing this function) so as to maximize the accuracy of this function for estimating the thermal performance of the system. Advantageously, this update is carried out by minimizing the difference between the implementation of the function Q calculated for the state $s_t$, the action $u_t$, and the current state of the control function π, and a function yt defined by:

$$y_t = r_{t+1} + \gamma Q(s_{t+1}, \mu(s_{t+1}) | \theta^Q) \qquad \text{[Math. 2]}$$

Where the function μ is defined by the control function π applied to the state $s_{t+1}$, that is, the action $u_{t+1}$. $\theta^Q$ denotes the parameters of the function Q, that is, the matrix of weighting factors of the neural network implementing this function, and γ is the depreciation factor of between 0 and 1. $y_t$ is therefore the reward $r_{t+1}$ at time t+1 plus the expectation of the sum of the rewards depreciated based on the state $s_{t+1}$.

Advantageously, this update is implemented by bootstrap by randomly taking a sub-set of N transitions $P_{i, i+1}$ stored in the memory, and calculating a $y_i$ for each of these transitions, and minimizing the quadratic error L provided by:

$$L = \frac{1}{N} \sum_i (y_i - Q(s_i, u_i | \theta^Q))^2 \qquad \text{[Math. 3]}$$

According to one variant embodiment, the so-called n-step return method is used, described for example in the publication Distributed Distributional Deterministic Policy Gradients (Hoffman et al, 2018), in order to take into account, in the error L, the n transitions following each transition used in the calculation of the error described above. In this case, the function $y_t$ becomes:

$$y_t = \sum_{j=0}^{n-1} \gamma^j r_{t+j} + \gamma^n Q(s_{t+n}, \mu(s_{t+n}) | \theta^Q) \qquad \text{[Math. 4]}$$

The expression of the function for estimating the thermal performance can then be reduced to:

$$Q^\pi(s_t, u_t) = r_t + E\left[\sum_{j=1}^{n-1} \gamma^j r_{t+j} + \gamma^n Q^\pi(s_{t+n}, \mu(s_{t+n})) \bigg| s_t, u_t\right] \qquad \text{[Math. 5]}$$

Depending on the value of the depreciation factor γ, the rewards subsequent to the function rt at a time t are taken into account to a greater or lesser extent in the calculation of the new function Q.

In one embodiment, the output of the neural network implemented by the block 23 is a scalar corresponding to the result of the function Q. Advantageously, a layer is added to the neural network before the output of the scalar resulting from the function Q making it possible to estimate the distribution of Q, in reality making it possible to calculate the expectation of Q using the Categorical method disclosed by the publication Distributed Distributional Deterministic Policy Gradients (Hoffman et al, 2018). Categorical allows the learning algorithm to converge more quickly and to be more efficient in the thermal control of the system.

In one embodiment, the depreciation factor γ is between 0.80 and 1 inclusive. Advantageously, it is between 0.97 and 0.99 inclusive. As thermal systems have high inertia, learning is more efficient by taking the subsequent thermal performance heavily into account for calculating the new function for estimating the thermal performance.

Likewise, still for considering thermal inertia, the gap between two time steps of the learning algorithm is important. For example, the time step can be between 0.1 and 2 seconds inclusive. A compromise must be found between too small a time step that does not consider the thermal inertia of the system, and too great a time step that does not allow the learning algorithm to converge. The determination of the number of return steps n in the so-called n-step return method is advantageously suitable for allowing satisfactory convergence of the learning algorithm. If there are too many values in too short a time frame, the learning algorithm cannot converge. For example, a value of n of between 3 and 10 inclusive can be applied, to cover a total time frame (corresponding to n times the time step) of between 1 and 6 seconds inclusive. For example, the time step selected can be 0.5 seconds, and n can be 4. The value of the time step and the value n of the n-step return are therefore correlated, in order to ensure the convergence of the algorithm.

Finally, during a step 160, the block 23 updates the control function of the block 21 of the computer based on the function for estimating the thermal performance. This step is implemented by the descent of the gradient of J, J being the expected value of the initial thermal performance of the system, which depends on the parameters of the control function π, and is defined by:

$$J = \mathbb{E}_{r_i, s_i \sim E, a_i \sim \pi}[R_1] \qquad \text{[Math. 6]}$$

Where $$R_t = \sum_{i=t}^{T} \gamma^{(i-t)} r(s_i, u_i) \qquad \text{[Math. 7]}$$

And where E is the environment.

The gradient of J is defined in equation (6) of the publication by Lillicrap et al cited above. According to the expression of the gradient of J, this descent of the gradient allows the parameters of the control function to be updated, in this case the matrix of the weighting factors of the neural network implemented by the block 21, so as to maximize the expected thermal performance.

In one embodiment, step 110 includes an additional sub-step 112 of adding an exploration noise to the control action $u_t$ determined by the computer 20 during sub-step 111, or directly to the parameters of the control function.

Compared with step 110 without this sub-step, the exploration noise added makes it possible to obtain improved efficiency of the thermal system by implementing exploratory training that allows it to learn any actions that further optimize the thermal system. The addition of the exploration noise is shown in FIG. 3 by a block 24 of the computer. In one embodiment, the exploration noise can be Gaussian white noise or a noise generated by an Ornstein Uhlenbeck process.

In one embodiment, once the control function has been trained using the method described above, the control function can be stored in a memory and then implemented directly by a second computer, separate from the first, this second computer being embedded in the vehicle. In this case, the second computer determines a control action as a function of a state of the thermal system using the control function previously trained.

Said control function can no longer be updated however, as the computer does not contain the training method in its memory.

In another embodiment, the computer 20 that implements the training of the control function can be a computer built into the target vehicle, and continue to update the control function as the vehicle is used.

The proposed invention therefore makes it possible to carry out optimized control of the thermal system of a vehicle motor without taking into account the complexity of modeling the system for a lower inference calculation cost and also for a lower economic cost. In addition, it can be adapted to a large number of vehicle motor thermal systems, which makes the invention flexible.

The invention claimed is:

1. A method for optimizing the thermal control of a vehicle motor, the vehicle including a cooling device configured to cool the motor, the device including at least one actuator configured to vary a capacity for cooling the motor by the cooling device, the method being implemented by a computer configured to control said at least one actuator, the method comprising training of a reinforcement learning algorithm comprising iterative implementation of the following steps:
   1) determining at least one action to control at least one actuator by applying a control function to a current state of a thermal system comprising the motor and the cooling device, and implementing said action;
   2) determining a modified state of the thermal system after the implementation of said at least one action;
   3) calculating, by implementing a thermodynamic reward function of the motor, a reward value based on the modified state of the thermal system, and said action;
   4) updating a function for estimating the thermal performance of the system based on the current state of the thermal system, the modified state of the thermal system, the action, and the reward value; and
   5) modifying the control function based on the update of the function for estimating the thermal performance of the thermal system.

2. The method for optimizing the thermal control as claimed in claim 1, wherein in step 1, an exploration noise is added to the determination of the control action or to a plurality of parameters of the control function.

3. The method for optimizing the thermal control as claimed in claim 2, wherein the thermodynamic reward function of the motor is configured to maximize the reward value when, based on the current state, the generation of thermodynamic irreversibilities brought about by the action is minimized.

4. The method for optimizing the thermal control as claimed in claim 2, wherein the modified state of the thermal system after an action comprises at least one parameter identifying at least one action preceding said action.

5. The method for optimizing the thermal control as claimed in claim 2, wherein the thermodynamic reward function of the motor is configured to penalize an action when the action causes a temperature of the motor to exceed a predetermined threshold.

6. The method for optimizing the thermal control as claimed in claim 1, wherein the thermodynamic reward function of the motor is configured to maximize the reward value when, based on the current state, the generation of thermodynamic irreversibilities brought about by the action is minimized.

7. The method for optimizing the thermal control as claimed in claim 6, wherein the modified state of the thermal system after an action comprises at least one parameter identifying at least one action preceding said action.

8. The method for optimizing the thermal control as claimed in claim 6, wherein the thermodynamic reward function of the motor is configured to penalize an action when the action causes a temperature of the motor to exceed a predetermined threshold.

9. The method for optimizing the thermal control as claimed in claim 1, wherein the function for estimating the thermal performance takes the following form:

$$Q^\pi(s_t, u_t) = r_t + E\left[\sum_{j=1}^{n-1} \gamma^j r_{t+j} + \gamma^n Q^\pi(s_{t+n}, \mu(s_{t+n})) \,\bigg|\, s_t, u_t\right] \qquad \text{[Math. 5]}$$

where γ is a depreciation factor, π is the set of parameters of the control function, and n is a number of additional time steps taken into account for calculating the function for estimating the thermal performance.

10. The method for optimizing the thermal control as claimed in claim 9, wherein the depreciation factor γ is between 0.8 and 1 inclusive.

11. The method for optimizing the thermal control as claimed in claim 9, wherein the value between two time steps of the training of the reinforcement learning algorithm is determined in correlation with the value n, and vice versa.

12. The method for optimizing the thermal control as claimed in claim 1, wherein the modified state of the thermal system after an action comprises at least one parameter identifying at least one action preceding said action.

13. The method for optimizing the thermal control as claimed in claim 12, wherein the thermodynamic reward function of the motor is configured to penalize an action when the action causes a temperature of the motor to exceed a predetermined threshold.

14. The method for optimizing the thermal control as claimed in claim 1, wherein the thermodynamic reward function of the motor is configured to penalize an action when the action causes a temperature of the motor to exceed a predetermined threshold.

15. The method for optimizing the thermal control as claimed in claim 1, wherein the thermodynamic reward function of the motor is configured to penalize an action when the action is implemented while an ambient temperature is greater than the temperature of the motor.

16. The method for optimizing the thermal control as claimed in claim 1, wherein the state of the thermal system is defined by at least one parameter from the following group: an air speed around the vehicle, the on or off state of the motor in the future, one or more temperatures of the motor, one or more entropy values of the thermal system, and one or more actions implemented before the current state.

17. The method for optimizing the thermal control as claimed in claim 1, wherein the motor is an electric motor.

18. A non-transitory computer-readable medium on which is stored a computer program containing coded instructions for implementing the method as claimed in claim 1, when the computer program is executed by a computer.

19. A thermal control system for a vehicle motor comprising:
   a computer that is configured to implement at least one action to control at least one actuator by applying a control function, said control function having been determined in advance by implementing the optimization method as claimed in claim 1.

20. A thermal control system for a vehicle motor, the thermal control system comprising:
   a computer configured to implement the method as claimed in claim 1.

* * * * *